(12) United States Patent
Nakasato et al.

(10) Patent No.: US 8,044,768 B2
(45) Date of Patent: Oct. 25, 2011

(54) KEYLESS ENTRY SYSTEM USING COMMUNICATION VIA HUMAN BODY

(75) Inventors: Mitsuharu Nakasato, Miyagi-ken (JP); Yuya Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1107 days.

(21) Appl. No.: 11/888,718

(22) Filed: Aug. 2, 2007

(65) Prior Publication Data
US 2008/0048827 A1 Feb. 28, 2008

(30) Foreign Application Priority Data

Aug. 28, 2006 (JP) .................................. 2006-230014

(51) Int. Cl.
*G05B 19/00* (2006.01)
(52) U.S. Cl. .............. 340/5.61; 340/426.16; 340/426.17
(58) Field of Classification Search ............. 340/426.13, 340/426.15, 426.17, 5.61, 5.54, 5.65, 5.3, 340/5.31
See application file for complete search history.

(56) References Cited

U.S. PATENT DOCUMENTS

| | | | | |
|---|---|---|---|---|
| 4,591,854 A * | 5/1986 | Robinson | ...................... | 340/5.65 |
| 5,157,389 A * | 10/1992 | Kurozu et al. | .................. | 340/5.3 |
| 5,204,672 A * | 4/1993 | Brooks | ....................... | 340/12.22 |
| 5,499,022 A * | 3/1996 | Boschini | ....................... | 340/5.62 |
| 5,682,135 A * | 10/1997 | Labonde | .................. | 340/426.17 |
| 6,580,356 B1 * | 6/2003 | Alt et al. | ......................... | 340/5.8 |
| 6,771,161 B1 * | 8/2004 | Doi et al. | ....................... | 340/5.64 |
| 6,980,082 B2 * | 12/2005 | Ueda et al. | ................... | 340/5.72 |
| 6,992,565 B1 | 1/2006 | Giesler | | |
| 7,126,453 B2 * | 10/2006 | Sandau et al. | ............... | 340/5.61 |
| 7,158,044 B2 * | 1/2007 | Monig et al. | ................ | 340/686.6 |
| 7,292,137 B2 * | 11/2007 | Gilbert et al. | .............. | 340/426.3 |
| 7,400,243 B2 * | 7/2008 | Sumida et al. | ........... | 340/539.11 |

(Continued)

FOREIGN PATENT DOCUMENTS

EP    1 168 678    1/2002

(Continued)

OTHER PUBLICATIONS

European Search Report for corresponding European Patent Application Serial No. 07013496.0.

*Primary Examiner* — Benjamin C Lee
*Assistant Examiner* — Stephen Burgdorf
(74) *Attorney, Agent, or Firm* — Brinks Hofer Gilson & Lione (57) ABSTRACT

A keyless entry system includes a vehicle-side device and a portable device including a portable device electrode. The vehicle-side device includes a vehicle-side controller and a vehicle-side electrode that is disposed in a position where communication with the portable device is performed via a human body when a person is getting off a vehicle. When the person carrying the portable device is getting off the vehicle, an electric field is induced by the portable device electrode in the human body. The vehicle-side controller performs authentication of the portable device upon detection of the electric field by the vehicle-side electrode. The vehicle-side controller determines the portable device has been left in the vehicle if the vehicle-side controller has no history of authentication or cannot perform authentication upon detection of the person's action of getting off the vehicle. A predetermined operation is performed based on this determination.

5 Claims, 5 Drawing Sheets

U.S. PATENT DOCUMENTS

| | | | |
|---|---|---|---|
| 7,403,099 B2 * | 7/2008 | Kamiya et al. | 340/426.29 |
| 7,545,255 B2 * | 6/2009 | Ohtaki et al. | 340/5.72 |
| 7,696,859 B2 * | 4/2010 | Teshima et al. | 340/5.72 |
| 7,868,733 B2 * | 1/2011 | Rhelimi | 340/5.61 |
| 2001/0028297 A1 * | 10/2001 | Hara et al. | 340/5.62 |
| 2002/0185999 A1 * | 12/2002 | Tajima et al. | 324/76.75 |
| 2003/0058086 A1 * | 3/2003 | Hara | 340/425.5 |
| 2003/0216817 A1 * | 11/2003 | Pudney | 700/17 |
| 2005/0038586 A1 * | 2/2005 | Griffin et al. | 701/45 |
| 2005/0159131 A1 * | 7/2005 | Shibagaki et al. | 455/345 |
| 2005/0219036 A1 | 10/2005 | Ueda et al. | |
| 2006/0045118 A1 * | 3/2006 | Hyoung et al. | 370/445 |
| 2006/0158322 A1 * | 7/2006 | Pinckney, Sr. | 340/426.28 |
| 2006/0170241 A1 * | 8/2006 | Yamashita | 296/146.4 |
| 2006/0197540 A1 * | 9/2006 | Negoro et al. | 324/690 |
| 2006/0279402 A1 * | 12/2006 | Okamitsu et al. | 340/5.62 |

FOREIGN PATENT DOCUMENTS

| | | |
|---|---|---|
| EP | 1 632 410 | 3/2006 |
| FR | 2 872 468 | 1/2006 |
| JP | 2000-064679 | 2/2000 |
| JP | 2001-077735 | 3/2001 |
| JP | 2002-009710 | 1/2002 |
| WO | WO 2004/078536 A2 * | 9/2004 |

* cited by examiner

KEYLESS ENTRY SYSTEM USING COMMUNICATION VIA HUMAN BODY

This application claims the benefit of Japanese Patent Application No. 2006-230014, filed on Aug. 28, 2006, the entire contents of which is hereby incorporated by reference.

BACKGROUND OF THE INVENTION

1. Field of the Invention

The present invention relates to a keyless entry system that performs communication between a vehicle-side device and a portable device to lock and unlock a door, etc., and more specifically, to a keyless entry system that can detect that a portable device is left in a vehicle, using human body communication.

2. Description of the Related Art

In a keyless entry system, a vehicle-side device is provided in a vehicle, such as an automobile, to perform wireless communication with a portable device carried by a driver, and if authentication is established, a door is locked and unlocked. A keyless entry system in which, if a portable device is in a vehicle, a predetermined switch is operated to perform authentication between a vehicle-side device and the portable device, and if authentication is established, an engine is started, is also known. In such keyless entry systems, a keyless entry system using communication via a human body between the portable device and the vehicle-side device is conventionally proposed. As such a keyless entry system, for example, there is a system as described in Japanese Patent Publication No. 2002-525702.

The conventional keyless entry system has a system that determines whether the portable device is in the vehicle, or is out of the vehicle in order to prevent the portable device from being left in the vehicle. For this purpose, a plurality of antennas is installed inside and outside the vehicle, and whether or not the portable device has received a signal from any one of the antennas is determined so that whether the portable device is either inside or outside the vehicle may be determined. However, a plurality of antennas is needed for determination of whether the portable vehicle is either inside or outside the vehicle, and the determination technique is also troublesome. Further, a technique using the communication via a human body between a vehicle-side device and a portable device in order to determine whether the portable device is either inside or outside the vehicle has not been known until now.

SUMMARY OF THE INVENTION

The invention has been made in view of the above problems. It is therefore one object of the invention to provide a keyless entry system that can determine whether a portable device is either inside or outside a vehicle using communication via a human body by a simple system.

In order to achieve the above object, the keyless entry system according to an aspect of the invention is a keyless entry system that performs communication between a vehicle-side device provided in a vehicle and a portable device. The vehicle includes a detector that detects a person's action of getting off the vehicle. The portable device has a portable device controller that performs communication of a signal for authentication, and a portable device electrode that makes an electric field induced in a human body by the signal. The vehicle-side device has a vehicle-side electrode that detects the electric field induced in the human body by the portable device electrode, and a vehicle-side controller that has a signal input thereto by an electric field detected by the vehicle-side electrode, and authenticates the signal. The vehicle-side controller determines that the portable device has been left in the vehicle if the vehicle-side controller has no history of authentication of the portable device when the person's action of getting off a vehicle has been detected by the detector, or if the vehicle-side controller cannot perform authentication of the portable device therewith immediately after the detection, and then makes the device provided in the vehicle perform a predetermined operation.

Moreover, in the keyless entry system according to the aspect of the invention, the vehicle includes a door handle received in a recess provided in an inner surface of a door, and the vehicle-side electrode is provided in a side wall of the recess so as be communicable with the portable device via the human body at the time of the person's preliminary action of getting off the vehicle.

Furthermore, in the keyless entry system according to the aspect of the invention, the vehicle includes a door handle received in a recess provided in an inner surface of a door, and the vehicle-side electrode is provided in the door handle so as be communicable with the portable device via the human body at the time of the person's preliminary action of getting off the vehicle.

Also, in the keyless entry system according to the aspect of the invention, the device provided in the vehicle is a notification means, and the vehicle-side controller makes the notification means operate to make a notification if the controller has determined that the portable device is left in the vehicle. Also, in the keyless entry system according to the aspect of the invention, the detector is a switch which detects the opening/closing state of the vehicle door.

According to the keyless entry system according to the aspect of the invention, the portable device has a portable device controller that performs communication of a signal for authentication, and a portable device electrode that makes an electric field, which is generated by modulation of the signal by the portable device controller, induced in a human body, the vehicle-side device has a vehicle-side electrode that detects the electric field induced in the human body by the portable device electrode, and a vehicle-side controller that has a signal input thereto by an electric field detected by the vehicle-side electrode, and authenticates the signal, and when the person's action of getting off a vehicle has been detected by the detector, the vehicle-side controller determines that the portable device has been left in the vehicle if the vehicle-side controller has no history of communication with the portable device by the vehicle-side electrode, or cannot perform communication therewith immediately after the communication with the portable device, and then makes the device provided in the vehicle perform a predetermined operation. Thereby, forgetting of the portable device can be determined by a simple system using communication via a human body.

Further, in the keyless entry system according to the aspect of the invention, the vehicle-side electrode is disposed in a position where the electrode is communicable with the portable device via a human body at the time of the person's preliminary action of getting off the vehicle. Thereby, communication via a human body can be performed with a person's preliminary action of getting off a vehicle; and positive determination about forgetting of the portable device can be performed.

Moreover, in the keyless entry system according to the aspect of the invention, the vehicle includes a door handle received in a recess provided in an inner surface of a door, and the vehicle-side electrode is provided in a side wall of the recess so as be communicable with the portable device via the human body at the time of the person's preliminary action of getting off the vehicle. Thereby, since a door handle on the inner surface of a door is necessarily operated at the time of getting off a vehicle, communication via a human body can be surely performed if the portable device is carried. Further, by providing the vehicle-side electrode in the side wall of the recess, it is not necessary to increase the size of a door handle.

Furthermore, in the keyless entry system according to the aspect of the invention, the vehicle includes a door handle received in a recess provided in an inner surface of a door, and the vehicle-side electrode is provided in the door handle so as be communicable with the portable device via the human body at the time of the person's preliminary action of getting off the vehicle. Thereby, since a door handle on the inner surface of a door is necessarily operated at the time of getting off a vehicle, communication via a human body can be surely performed if the portable device is carried.

Also, in the keyless entry system according to the aspect of the invention, the device provided in the vehicle is a notification means, and the vehicle-side controller makes the notification means operate to make a notification if the controller has determined that the portable device is left in the vehicle. Thereby, when the portable device is left in the vehicle, a user can be surely notified of the event. Also, in the keyless entry system according to the aspect of the invention, the detector is a switch which detects the opening/closing state of the vehicle door. Thereby, a person's action of getting off the vehicle is surely detected.

DESCRIPTION OF THE PREFERRED EMBODIMENT

Figure 1:
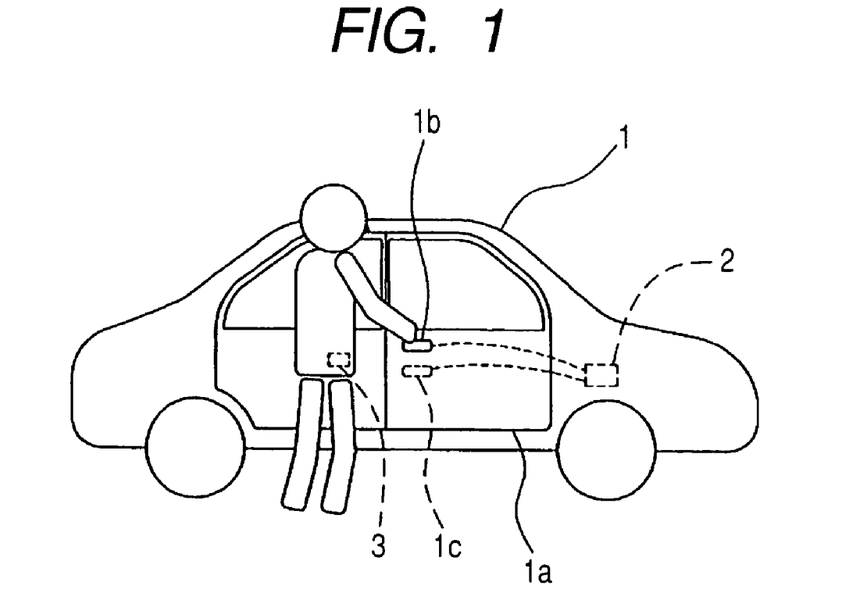
FIG. 1 is a schematic diagram of a keyless entry system according to one embodiment.

Embodiments of the invention will be described in detail with reference to the drawings. A schematic diagram of a keyless entry system according to one embodiment is shown in FIG. 1. As shown in this figure, the keyless entry system according to one embodiment communicates via a human body between a vehicle-side device 2 provided in a vehicle 1, and a portable device 3 carried by a user, performs certification of an ID, and operates locking or unlocking of a door 1a, notification of forgetting, etc.

Figure 2:
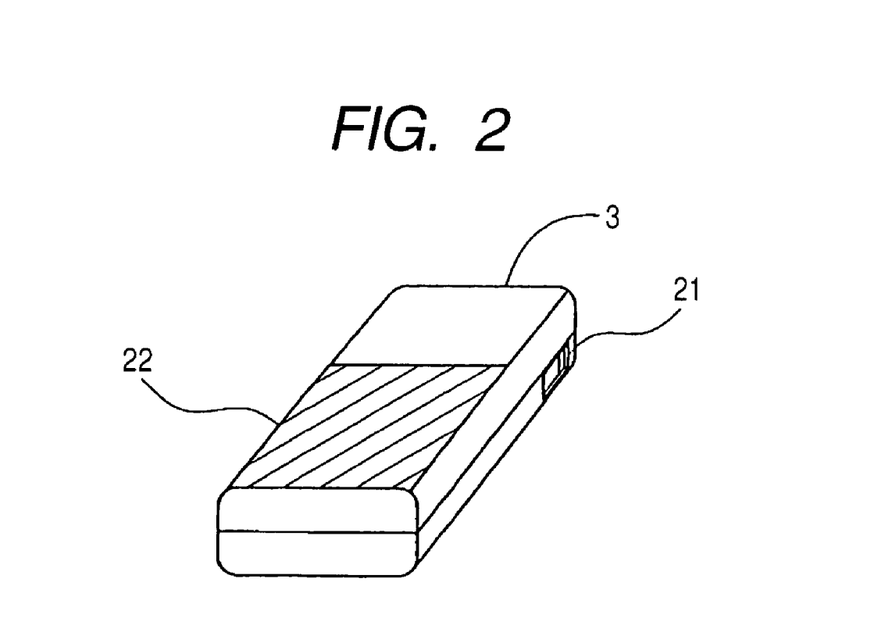
FIG. 2 is a perspective view of a portable device.

A perspective view of the portable device 3 is shown in FIG. 2. As shown in this figure, the portable device 3 is formed in the shape of a thin box, and a side portion thereof is provided with a power switch 21. Further, the portable device electrode 22 is disposed to the region shown in the surface of the portable device 3 by hatching in a figure. When this portable device electrode 22 and a human body are in contact or in close contact with each other, an electric field can be induced in the human body by the portable device electrode 22, and the portable device 3 can perform communication via the vehicle-side device 2 and the human body by detecting the electric field induced in this human body on the side of the vehicle 1. In addition, the arrangement of the portable device electrode 22 is not limited to that shown in FIG. 2, but a region where the portable device electrode is disposed, and its size can be set appropriately. Further, the portable device electrode 22 may be disposed such that it is exposed to the surface, or the portable device electrode may be provided on the side of the inner surface of the portable device 3 in the vicinity of the surface thereof within a range in which it can induce an electric field in a human body.

Figure 3:
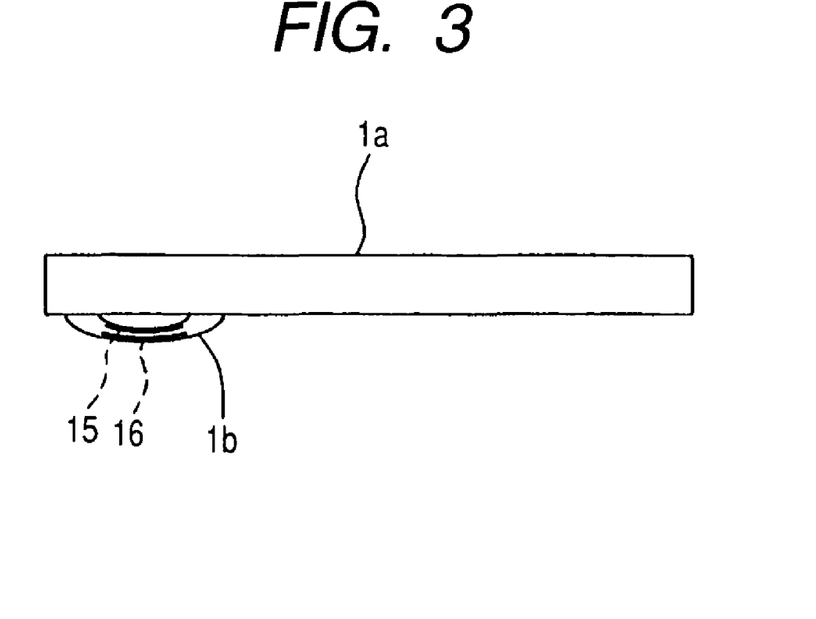
FIG. 3 is a view schematically showing a door handle provided outside a door.

FIG. 3 is a view schematically showing a door handle 1b provided outside the door 1a. As shown in this figure, the door handle 1b outside the vehicle is provided in the shape of a handle on the outer surface of the door 1a. When the door 1a is opened, a user operates to hold the door handle 1b and pull it towards the near side, and when the door 1a is closed, the user operates to push the outer surface of the door handle 1b.

An unlocking electrode 15 is provided on the side of the inner surface of the door handle 1b in the vicinity of the surface thereof, and a locking electrode 16 is provided on the side of the outer surface of the door handle 1b in the vicinity of the surface thereof. When a user who carries the portable device 3 operates the door handle 1b so as to open the door 1a from the outside of the vehicle, the user operates to hold the inner surface of the door handle 1b and pull the door handle. Thus, an electric field induced in the human body by the portable device electrode 22 of the portable device 3 can be detected by the unlocking electrode 15. Here, if authentication is established, the door will be unlocked. On the other hand, when the user who carries the portable device 3 operates the door handle 1b so as to close the door 1a, the user operates to push the outer surface of the door handle 1b. Thus, an electric field induced in the human body by the portable device electrode 22 of the portable device 3 can be detected by the locking electrode 16. Here, if authentication is established and the door is closed, the door will be locked. In addition, in this case, a door is locked or unlocked on one condition that a human body has contacted either the unlocking electrode 15 or the locking electrode 16. However, various methods of unlocking a door when a common electrode is used and the door is locked, and of locking the door when the door is closed in an unlocked state can be performed.

Figure 4:
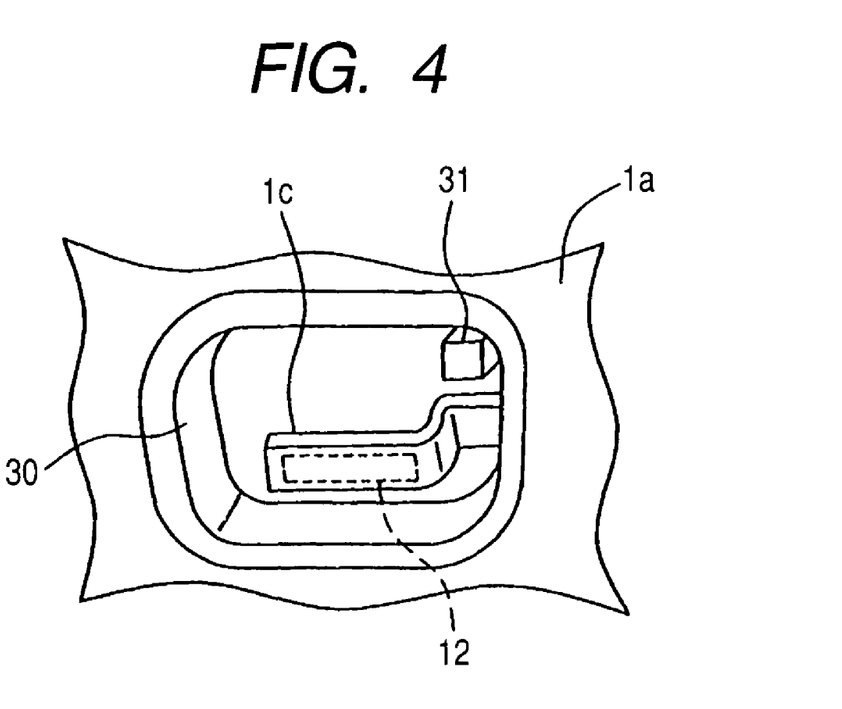
FIG. 4 is a perspective view of a door handle provided inside a door.

FIG. 4 is a perspective view of a door handle 1c provided inside the door 1a. As shown in this figure, the door handle 1c on the side of the vehicle is formed in the shape of a lever, and is provided so as to be received in a recess 30 provided in the inner surface of the door 1a. Further, the door handle 1c is supported by the door 1a such that its end is freely rotatable towards the near side. By inserting a hand into the recess 30 and pulling the rear surface of the door handle 1c towards the near side when the door handle 1c is operated, the door 1a can be opened from the inside of the vehicle.

Further, a lock operation unit 31 is provided in an upper portion in the recess 30 on the side of an end where the door handle 1c rotates. By operating the lock operating unit, the door 1a can be manually locked or unlocked.

Moreover, a vehicle-side electrode 12 is disposed in the door handle 1c of the recess 30. The vehicle-side electrode 12 may be disposed so as to be exposed to an inner wall that faces the door handle 1c, or may be buried in the vicinity of the inner wall of the recess 30. When a user who carries the portable device 3 operates the door handle 1c so as to open the door 1a from the inside of the vehicle, the user operates to insert his/her hand into the recess 30 and then pull the door handle 1c. Thus, an electric field induced in the human body by the portable device electrode 22 of the portable device 3 can be detected by the vehicle-side electrode 12.

Figure 5:
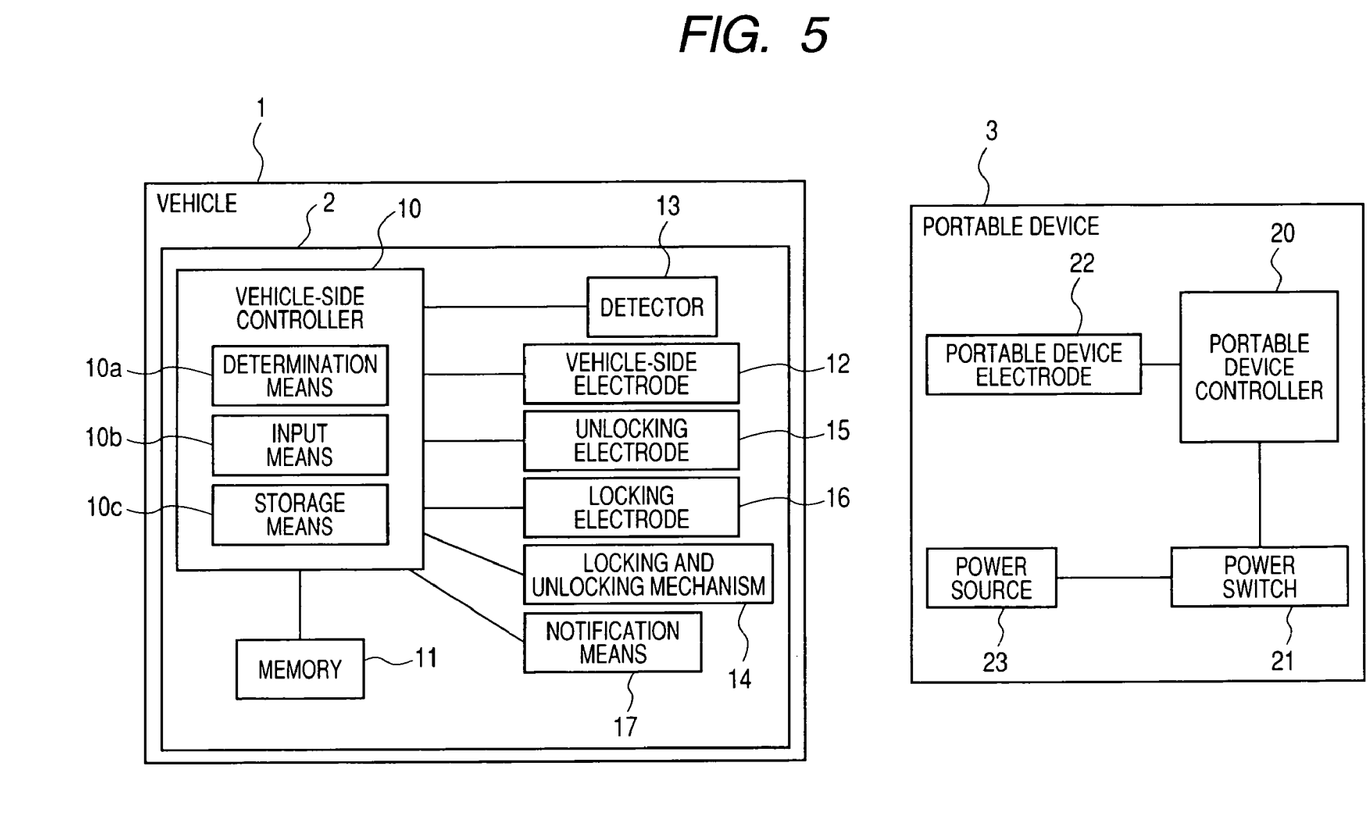
FIG. 5 is a block diagram of the keyless entry system according to one embodiment.

A block diagram of the keyless entry system according to one embodiment is shown in FIG. 5. As shown in this figure, the vehicle-side device 2 provided in the vehicle 1 includes a vehicle-side controller 10 that performs various kinds of control, a memory 11 that stores data to be used by the vehicle-side controller 10, the aforementioned vehicle-side electrode 12, unlocking electrode 15 and locking electrode 16, a detector 13 that detects that the door 1a opened, a locking and unlocking mechanism 14 that locks and unlocks the door 1a, and a notification means 17 that makes a notification when a user gets off the vehicle, leaving the portable device 3 in the vehicle. Further, the portable device 3 includes the portable device controller 20 that performs storage of an ID composed of predetermined bits, various kinds of control, and modulation of signals to be output, the power switch 21, the portable device electrode 22, and the power source 23. A signal that is obtained by modulating a signal showing the ID is repeatedly output to the portable electrode 22.

The vehicle-side controller 10 includes a storage means 10c that temporarily stores data, a determination means 10a that performs authentication of a signal from the portable device 3, and determination of whether or not the portable device 3 is left in the vehicle, and an input unit 10b that demodulates the signal on the basis of detection of an electric field in each electrode, and allows the signal to be stored in the storage means 10c. Further, the vehicle-side controller 10 is in a state of being capable of receiving signals from the vehicle-side electrode 12, the unlocking electrode 15, and the locking electrode 16.

Further, the memory 11 provided in the vehicle-side device 2 stores an ID unique to the portable device 3 for the vehicle 1. The determination means 10a of the vehicle-side controller 10 collates an ID included in the signal temporarily stored in the storage means 10c with the ID stored in the memory 11, and determines that the signal has been authenticated if these IDs coincides with each other, or determines that the signal has not been authenticated if these IDs do not coincide with each other.

The detector 13 detects the opening/closing state of the door 1a, and is constituted by a switch. When the detector 13 has detected that the door 1a is opened, the determination means 10a of the vehicle-side controller 10 determines the existence/nonexistence of forgetting of the portable device 3 in the vehicle. Further, the notification means 17 is controlled by the vehicle-side controller 10, and generates voice on the occasion of a notification operation to notify a user of an event that the portable device 3 is left in the vehicle.

When a person in the vehicle gets off, the person first makes a preliminary action for getting off the vehicle that he/she first operates the door handle 1c in the vehicle. Subsequently, the person makes an action of getting off the vehicle that he/she opens the door 1a, stands up from a seat in the vehicle, and comes out of a vehicle. The aforementioned vehicle-side electrode 12 is provided in the door handle 1c or in the vicinity thereof, and exists in a place where it is not touched by the person's hand at the time of the preliminary action for getting off the vehicle. Accordingly, when a person who carries the portable device 3 makes the preliminary action of getting off the vehicle, the vehicle-side device 2 can communicate with the portable device 3 via the person's body by the vehicle-side electrode 12. On the contrary, when a who does not carry the portable device because the portable device 3 is left in the vehicle makes a preliminary action of getting off the vehicle, the vehicle-side device 2 cannot communicate with the portable device 3.

Figure 6:
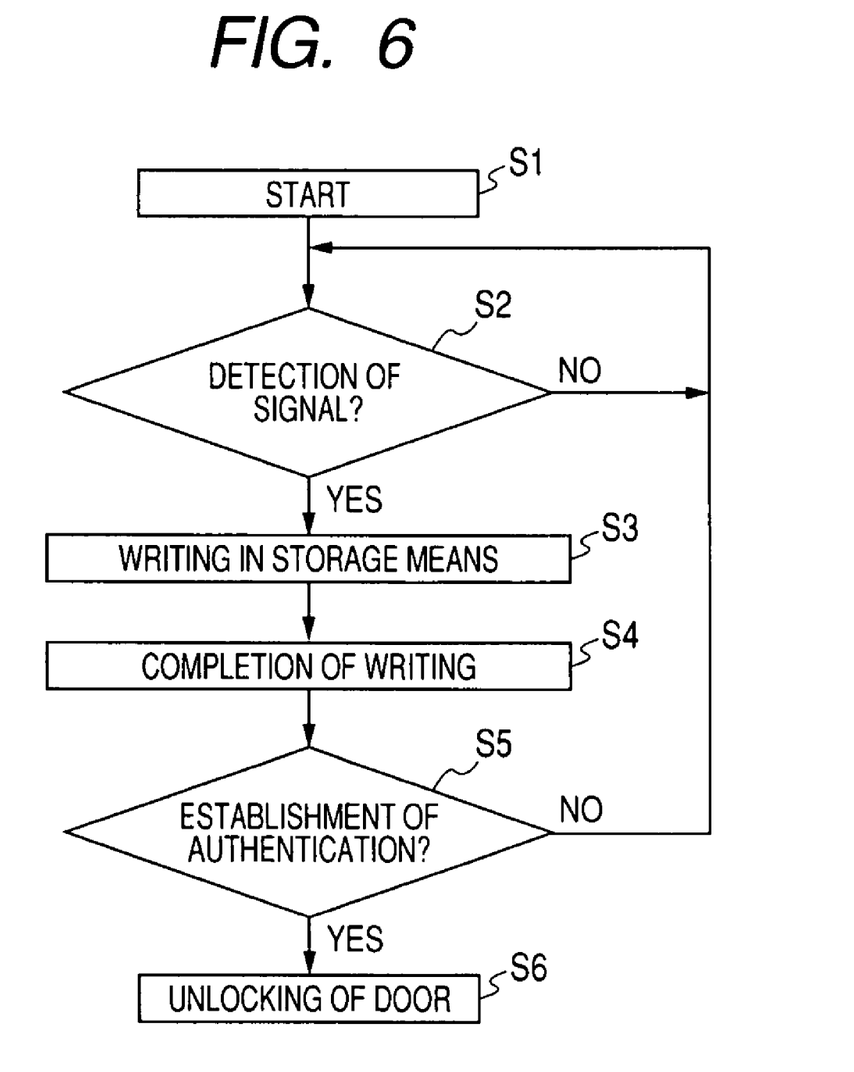
FIG. 6 is a flow chart showing the operation of unlocking a door.

Next, the operation of the keyless entry system will be described according to a flow chart. First, the operation of unlocking the door 1a of a vehicle 1 in order for a person to get in the vehicle 1 from the outside of the vehicle will be described. FIG. 6 is a flow chart showing the operation of unlocking the door 1a. In this flow chart, it is supposed that the door 1a is in a locked state at the time of a start (S1).

The vehicle-side controller 10 of the vehicle-side device 2 is in a standby state until the unlocking electrode 15 detects a signal transmitted via a human body from the portable device 3 (S2). When a person who carries the portable device 3 operates the door handle 1b from the outside of the vehicle, an electric field induced in a human body can be detected by the unlocking electrode 15 disposed at the inner peripheral surface of the door handle 1b. Further, the vehicle-side controller 10 demodulates the electric field to convert it into a signal including the ID of the portable device 3. In addition, even if a person who does not carries the portable device 3 operates the door handle 1b from the outside of the vehicle, the unlocking electrode 15 does not detect an electric field. Thus, the vehicle-side controller 10 will continue its standby state as it is.

In addition, if the door handle 1b is operated from the outside of the vehicle by a person who does not carries the portable device 3, and a signal from the portable device 3 is detected by the unlocking electrode 15, the vehicle-side controller 10 writes the signal in the storage means 10c (S3). If all signal data are stored in a region corresponding to predetermined bits of the storage means 10c, or if the data are written in a portion corresponding to a final bit among the regions of the storage means 10c, or after lapse of predetermined time after writing is started, writing is considered to be completed (S4).

If the writing is completed, the vehicle-side controller 10 collates an ID stored in the memory 11 with the ID included in the signal written in the storage means 10c, thereby performing authentication (S5). If the authentication is established, the vehicle-side controller 10 determines that a person who carries a regular portable device 3 has operated the door handle 1b, and then makes the locking and unlocking mechanism 14 operated so that the locked state of the door 1a may be released. This unlocks the door 1a (S6). On the other hand, if the authentication is not established in S5, the process will return to Step S2 and will again be in the standby state. According to such a flow, when a user who carries the portable device 3 operates the door handle 1b provided outside the door 1a from the outside of the vehicle, the operation of unlocking the door 1a can be can be performed using communication via a human body.

Figure 7:
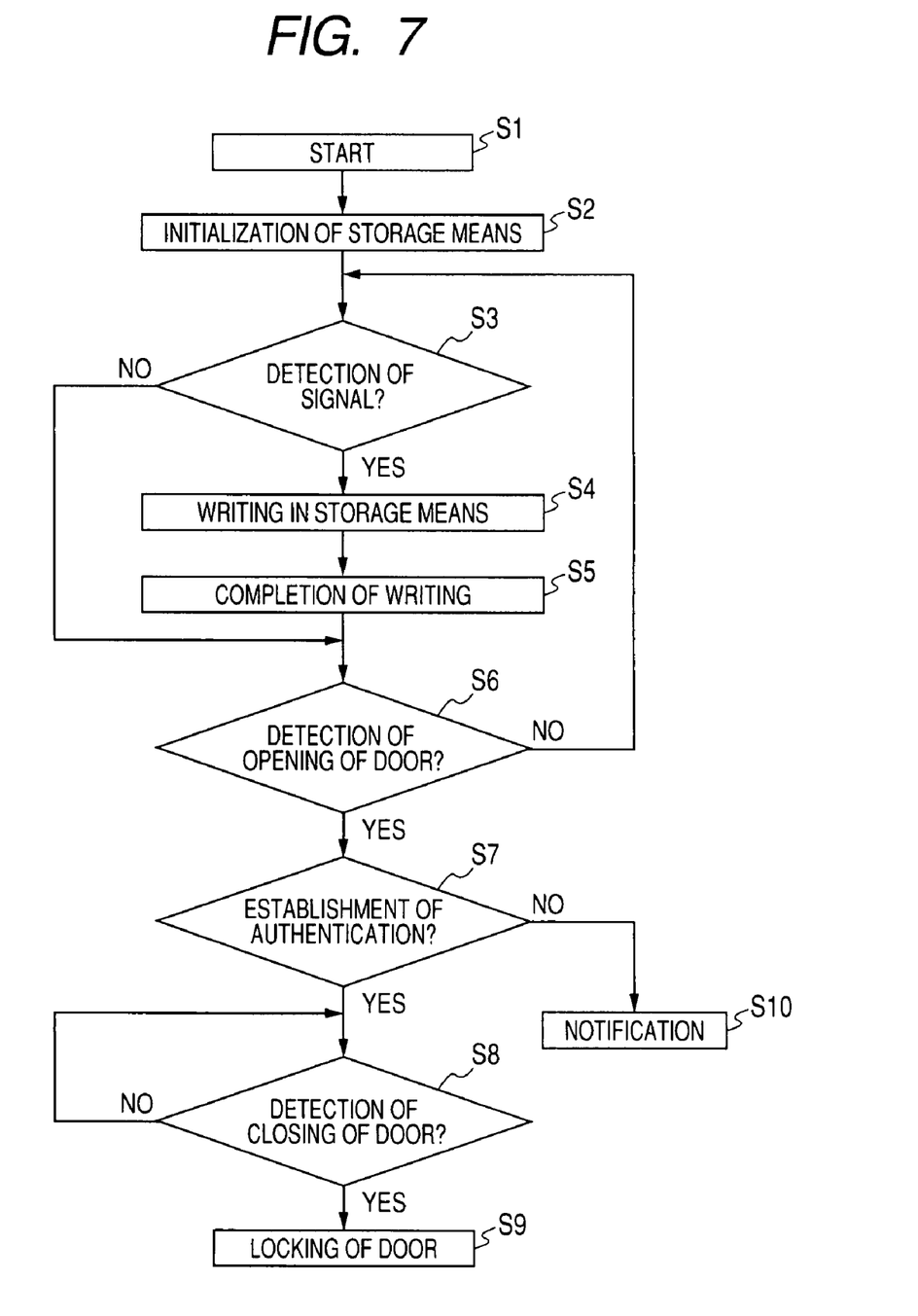
FIG. 7 is a flow chart of the operation of determining forgetting of a portable device in a vehicle.

Next, the operation of making a notification when a person has got off from the inside of the vehicle, and has left the portable device 3 in the vehicle will be described. FIG. 7 is a flow chart of the operation of determining forgetting of the portable device 3 in a vehicle. In this flow chart, it is supposed that an engine is stopped at the time of a start (S1).

The vehicle-side controller 10 of the vehicle-side device 2 first initializes the storage means 10c to erase the contents stored therein (S2). Next, the vehicle-side controller 10 is in a standby state until the vehicle-side electrode 12 detects a signal transmitted via a human body from the portable device 3 (S3). When a person who carries the portable device 3 operates the door handle 1c from the inside of the vehicle, an electric field induced in a human body by the portable device electrode 22 can be detected because the person's hand contacts or is close to the vehicle-side electrode 12 disposed in the door handle 1c. Further, the vehicle-side controller 10 demodulates the electric field to convert it into a signal including the ID of the portable device 3.

In addition, if a signal from the portable device 3 is detected by the vehicle-side electrode 12, the vehicle-side controller 10 writes the signal in the storage means 10c (S4). If all signal data are stored in a region corresponding to predetermined bits of the storage means 10c, or if the data are written in a portion corresponding to a final bit among the regions of the storage means 10c, writing is completed after lapse of predetermined time after writing is started (S5).

If any signal is not detected in S3, the process proceeds to Step S6 without performing writing of a signal in the storage means 10c. The case where any signal is not detected in S3 means either a state where a person who carries the portable device 3 has not operated the door handle 1c yet, or a state where a person who does not carry the portable device 3 has operated the door handle 1c.

Next, the vehicle-side controller 10 determines whether or not the open state of the door 1a has been detected (S6). In this step, if the open state of door 1a is detected by the detector 13, the controller proceeds to the following Step, and if not detected, the controller returns to Step S3. If the open state of the door 1a is detected, the vehicle-side controller 10 collates an ID stored in the memory 11 with the ID included in the signal written in the storage means 10c, thereby performing authentication (S7). If the authentication is established, the vehicle-side controller 10 determines whether or not the closed state of the door 1a has been detected by the detector 13 (S8). In this step, if the detector has detected that the door 1a is in a closed state, the door 1a is locked by the locking and unlocking mechanism 14 (S9). On the other hand, if the authentication is not established in S7, the vehicle-side controller 10 determines that the person has got off the vehicle, leaving the portable device 3 in the vehicle, and then notifies the notification means 17 of the event (S10).

As described above, the vehicle-side electrode 12 is disposed in a position where communication with the portable device 3 via a human body on the occasion of a preliminary action of getting off a vehicle can be performed. If authentication is established by this communication, there is no forgetting of the portable device 3, and if communication (if there is no communication history) is not performed, and authentication is not established, it is determined that the portable device 3 is left in the vehicle so that a notification operation by the notification means 17 may be performed. Thereby, a user can be surely notified of forgetting of the portable device 3 by a simple system using communication via a human body.

Also, since the operation of locking a door after a person gets off a vehicle with the portable device 3, and touches the outer surface of the door handle 1b in order to close the door is almost the same as the operation of unlocking a door, details thereof are omitted herein. It is noted herein that locking of a door is performed after the door is closed.

Next, a preliminary action of getting off a vehicle, an action of getting off a vehicle, and a modified example thereof of will be described. When a person gets off a vehicle, it is common that the person turns an engine switch into a stop position or pushes an engine stop switch to stop an engine, releases a door lock, pulls an internal door handle to open a door, stands up from a seat, comes out of the vehicle, and closes the door.

Here, the action of getting off a vehicle corresponds to an action from which a person is expected to get off a vehicle in future, and an action of closing a door. The action from which a person is expected to get off a vehicle in future corresponds to actions for actually opening a door, i.e., an action of releasing a door lock, an action of pulling a door handle, and an action of opening a door like the embodiments, and actions to be performed after any one of these actions, specifically, an action of standing up from a seat, an action of closing a door, etc. In the case of detection of the standing-up action, a weight detecting sensor is provided in a seat in a vehicle, and whether or not a person has got off from the seat is determined by using the weight detecting sensor as the detector 13.

The preliminary action of getting off a vehicle indicates actions to be inevitably performed by a person who is located in the vehicle before getting off the vehicle, specifically, means an action of stopping an engine, an action of inserting the person's hand into the recess 30 for pulling a door handle like the embodiments, an action of touching the door handle like the embodiments, etc. In addition, as the preliminary action of getting off a vehicle, an action that is higher in the possibility of performing the action of getting off the vehicle in future is set preferably, or the action of inserting the person's hand into the recess 30 provided in a door handle for pulling the door handle like the embodiments is more preferable. If a person carries a portable device, the portable device is authenticated in the step of this preliminary action, and determination is performed from the result of this authentication with the timing of the subsequent action of getting off the vehicle.

Further, although a mechanical key is not used in the present embodiment, an action of pulling a key from a key cylinder may be adopted as the preliminary action, and an action of closing a door may be adopted as the action of getting off a vehicle. In that case, it is necessary to pull out the key after notification. Thus, even if a door is closed, it is necessary that the door is not locked immediately when being notified.

Further, in the flow shown in FIG. 7, the vehicle-side controller 10 determines whether or not the open state of the door 1a has been detected after whether or not a signal has been detected by the vehicle-side electrode 12. That is, the vehicle-side controller performs the above determination with the timing of the action of getting off a vehicle that authentication is performed in the preliminary action. In this case, immediately after the door 1a is opened, a person's hand is in contact with the door handle 1c. Thus, the vehicle-side controller may be in a stand-by state until the open state of the door 1a is detected, and the vehicle-side controller may perform the interruption processing of determining the existence/nonexistence of signal detection by the vehicle-side electrode 12 immediately when the open state of the door 1a is detected.

Further, although communication is always performed in the present embodiment, communication may be intermittently performed. Otherwise, when opening of a door has been detected, a command is issued so that a signal may be transmitted to a portable device from the vehicle side. If the portable device has received the signal, a signal may be transmitted to the vehicle side from the portable device, and then if authentication of the signal is not established, notification may be made. In this case, communication will be confirmed immediately after opening of a door is detected.

Further, according to one embodiment, stop of an engine corresponds to initiation of the action of getting off a vehicle. Thus, if a memory is reset at this time, whether or not a person has got off the vehicle with a portable device can be determined simply and surely. However, the invention is not limited thereto. For example, a timer may be provided, a predetermined period of time that is obtained by adding some margin to a time interval while the preliminary action and the action of getting off a vehicle are performed with an actual action of getting off a vehicle may be stored, and then the period of time may be erased upon lapse thereof.

Further, in the above embodiments, as for the authentication at the time of forgetting, if the ID of a portable device completely coincides with an ID stored in the storage means, it is authenticated that the portable device is a regular portable device. However, so-called simple and easy determination that it is determined that a person carries a portable device if it is determined to be the ID of the portable device, or if the first parts of IDs do not coincide with each other, may be made. Further, as for the authentication at the time of forgetting, if the ID of a portable device does not completely coincides with an ID stored in the storage means, there is no problem even if the simple and easy determination is made in the authentication of door locking to be subsequently performed.

Furthermore, an action when the door handle 1b is operated, and a signal is detected by the locking electrode 16 may be adopted as the preliminary action, and an action of closing the door 1a may be adopted as the action of getting off a vehicle. In that case, when notification has been made, it is necessary that the door is not locked immediately even if a door is closed.

Although the embodiments of the invention have been described hitherto, the invention is not limited to the above embodiments in its application, and may be applied variously within the scope of the technical idea of the invention.

We claim:

1. A keyless entry system, comprising:
    a detector that detects a person's action of getting off a vehicle;
    a portable device including a portable device controller that perform communication of a signal for authentication and a portable device electrode that induces an electric field in a human body by the signal; and
    a vehicle side device provided in the vehicle, in communication with the portable device, and including:
        a vehicle-side electrode that is disposed inside the vehicle and in a position where the vehicle-side electrode is communicable with the portable device via a human body at the time of a person's preliminary action of getting off the vehicle, and that detects the electric field, wherein the person's preliminary action is followed by the person's action in getting off the vehicle, and
        a vehicle-side controller that has a signal input thereto by the electric field and that authenticates the signal, and
    wherein when the detector detects the person's preliminary action of getting off the vehicle, the vehicle-side controller determines that the portable device has been left in the vehicle if the vehicle-side controller has no history of authentication of the portable device, or if the vehicle-side controller cannot perform authentication of the portable device therewith, immediately after the detection by the detector, and
    wherein the vehicle-side device further includes a device provided in the vehicle, the vehicle-side controller making the device perform a notification operation based on the determination that the portable device has been left in the vehicle.

2. The keyless entry system according to claim 1, wherein the vehicle includes a door handle received in a recess provided in an inner surface of a door, and wherein the vehicle-side electrode is provided in a side wall of the recess so as be communicable with the portable device via the human body at the time of the person's preliminary action of getting off the vehicle.

3. The keyless entry system according to claim 1, wherein the vehicle includes a door handle received in a recess provided in an inner surface of a door, and wherein the vehicle-side electrode is provided in the door handle so as be communicable with the portable device via the human body at the time of the person's preliminary action of getting off the vehicle.

4. The keyless entry system according to claim 1, wherein the device provided in the vehicle is a notification means, and the vehicle-side controller makes the notification means operate to make a notification if the controller has determined that the portable device is left in the vehicle.

5. The keyless entry system according to claim 1, wherein the detector is a switch that detects the opening/closing state of the vehicle door.

* * * * *